(12) United States Patent
Alpha

(10) Patent No.: US 7,010,527 B2
(45) Date of Patent: Mar. 7, 2006

(54) LINGUISTICALLY AWARE LINK ANALYSIS METHOD AND SYSTEM

(75) Inventor: Shamim A. Alpha, Foster City, CA (US)

(73) Assignee: Oracle International Corp., Redwood Shores, CA (US)

(*) Notice: Subject to any disclaimer, the term of this patent is extended or adjusted under 35 U.S.C. 154(b) by 554 days.

(21) Appl. No.: 09/928,962

(22) Filed: Aug. 13, 2001

(65) Prior Publication Data

US 2003/0061214 A1    Mar. 27, 2003

(51) Int. Cl.
*G06F 17/30* (2006.01)

(52) U.S. Cl. .................. 707/7; 707/3; 707/5; 707/10; 707/104.1; 709/218; 709/219

(58) Field of Classification Search .................. 707/3, 707/5, 10, 104.1, 205, 7, 100; 709/203, 218, 709/219; 715/501.1, 513; 345/738, 762, 345/848
See application file for complete search history.

(56) References Cited

U.S. PATENT DOCUMENTS

| | | | | |
|---|---|---|---|---|
| 5,446,891 A | * | 8/1995 | Kaplan et al. | 707/2 |
| 5,761,683 A | * | 6/1998 | Logan et al. | 715/513 |
| 5,913,215 A | * | 6/1999 | Rubinstein et al. | 707/10 |
| 6,073,135 A | * | 6/2000 | Broder et al. | 707/100 |
| 6,085,226 A | * | 7/2000 | Horvitz | 709/203 |
| 6,112,202 A | * | 8/2000 | Kleinberg | 707/5 |
| 6,112,203 A | * | 8/2000 | Bharat et al. | 707/5 |
| 6,237,006 B1 | * | 5/2001 | Weinberg et al. | 707/103 R |
| 6,256,620 B1 | * | 7/2001 | Jawahar et al. | 707/2 |
| 6,285,999 B1 | * | 9/2001 | Page | 707/5 |
| 6,356,899 B1 | * | 3/2002 | Chakrabarti et al. | 707/5 |
| 6,418,433 B1 | * | 7/2002 | Chakrabarti et al. | 707/5 |
| 6,480,882 B1 | * | 11/2002 | McAdam et al. | 709/202 |
| 6,526,440 B1 | * | 2/2003 | Bharat | 709/219 |
| 6,549,896 B1 | * | 4/2003 | Candan et al. | 707/2 |
| 6,567,797 B1 | * | 5/2003 | Schuetze et al. | 707/2 |
| 6,711,568 B1 | * | 3/2004 | Bharat et al. | 707/5 |

* cited by examiner

*Primary Examiner*—Jeffrey Gaffin
*Assistant Examiner*—Jacques Veillard
(74) *Attorney, Agent, or Firm*—McDonald Hopkins Co., LPA

(57) ABSTRACT

A method and system for determining relevance rankings for pages identified in a search query is provided. In response to the search query, an information retrieval system identifies candidate pages/documents from a network that potentially match the search query. A relevance ranking system determines a relevance value for each of candidate pages so that the most relevant pages are displayed to a user. The relevance value is based on a combination of content-based relevance values of the pages and link values determined from a link structure of the pages. A link value is a function of a probability that a user will follow the link as compared to following all other links. With the present invention, improved relevance rankings are obtained for a candidate set of pages.

29 Claims, 4 Drawing Sheets

LINGUISTICALLY AWARE LINK ANALYSIS METHOD AND SYSTEM

FIELD OF THE INVENTION

The invention relates to the network information retrieval and relevance ranking arts. It finds particular application to a method and system of combining link analysis from web pages and linguistic characteristics of the web pages to obtain relevance rankings for search query results.

BACKGROUND OF THE INVENTION

The Internet, including the World Wide Web (the "Web") allows access to enormous amounts of information which grows in number daily. This growth, combined with the highly decentralized nature of the Web, creates a substantial difficulty in locating selected information content. Prior art Web search services generally perform an incremental scan of the Web to generate various, often substantial indexes that can be later searched in response to a user's query. The generated indexes are essentially databases of document identification information. Search engines uses these indexes to provide generalized content based searching but a difficulty occurs in trying to evaluate the relative merit or relevance of identified candidate documents. A search for specific content in documents or web pages in response to a few key words will almost always identify candidate documents whose individual relevance is highly variable. Thus, a user's time can be inefficiently spent on viewing numerous candidate documents that are not relevant to what they are looking for.

Some prior search engines attempt to improve relevancy scores of candidate documents by analyzing the frequency of occurrence of the query terms on a per document basis. Other weighing heuristics, such as the number of times that any of the query terms occur within a document and/or their proximity to each other, have also been used. These relevance ranking systems typically presume that increasing occurrences of specific query terms within a document means that the document is more likely relevant and responsive to the query. However, this assumption is not always accurate.

Another method to determine the relevancy of a document is by using link analysis. Generally, link analysis assumes a that if important web pages point to a document, then the document is also probably important or relevant. However, typical link analysis models a user's search for information on the Web as fluid moving between different containers where the webpages are represented by containers and links out of a webpage are represented by connecting conduits with the same diameter. What this model assumes is that users coming to a webpage must leave the webpage by following one of the links from the webpage and users are equally likely to follow any of the links from the webpage. If a page does not refer to any webpage, it is assumed to refer to all the webpages. By solving a steady state solution of the system, the model finds the relative likelihood of finding the user on a webpage if a snapshot of the system was taken. The basic problem with the model is that people are not like fluids.

Rather, people can evaluate the relevance of a webpage for a query. That has two implications on the behavior of the user in the system: 1) users will be likely to stop searching based on the relevance of a webpage, and 2) choosing between two links, users will be more likely to follow a link to the more relevant page.

Based on these implications, there is a need for a relevance ranking system where the probability of not leaving a webpage is a function of the relevance of the webpage, and the probability of following an outgoing link from a webpage is a function of the relevance of all referred webpages and the relevance of the webpage.

The present invention provides a method and system for generating relevancy rankings that cures the above problems and others.

SUMMARY OF THE INVENTION

According to one embodiment of the present invention, a method of determining a relevance rank for each of a plurality of pages identified by a search query is provided. The method determines a content-based relevance rank for each of the pages based on a content of each page. The content-based relevance rank of each page is then adjusted based on a link structure of the pages including link rank values from in-coming links.

According to a more limited aspect of the present invention, the link rank value for each out-going link from an associated page is based on a probability that a user will leave the associated page.

According to yet a more limited aspect of the present invention, the link rank value for each out-going link from an associated page is determined by distributing the probability of leaving the associated page to all out-going links of the associated page weighted by the content-based relevance rank of a page referenced by the out-going link According to another embodiment of the present invention, a system for determining a relevance rank for each page of a candidate set of pages identified by a search query is provided. The system includes content analyzer logic that obtains a content-based relevance rank for each of the pages based on a content of each page. A relevance rank analyzer then obtains a relevance rank for each page where the relevance rank for a page is obtained by combining the content-based relevance rank of the page with a link analysis rank from in-coming page links.

According to a more limited aspect of the present invention, the system further includes link structure logic that obtains a link structure of the candidate set of pages to determine in-coming and out-going page links.

According to a more limited aspect of the present invention, the system further includes an information retrieval system for identifying the candidate set of pages from a network in response to the search query.

One advantage of the present invention is that relevance rankings are based on linguistically aware link analysis where link values incorporate content-based relevance values of associated pages as a function of the page link structure.

Another advantage of the present invention is that relevance rankings are improved to provide more relevant page information to a user in response to a search query.

Another advantage of the present invention is it assumes that the probability that a user will follow a selected outgoing link is not equal between all out-going links from a given page. Rather, some are more likely to be followed than others if the user believes the destination page is relevant to their query. Even if the website does not provide any clue (the text associated with link or url itself) to the visitors about which links are more likely to be relevant, users are still more likely to follow a link that points to a more relevant webpage. If upon following a bad (with inferior content) link, visitors will immediately bounce back to the referrer page and follow another link. Users will be effectively spending more time on a page with better content. That will likely mean that we will find the user on a more relevant referred page even in the absence of a visible clue on the referrer page. Thus, the relevance ranking of the present invention combines link analysis rankings with content relevance rankings to obtain page rankings.

Yet another advantage of the present invention is that since it combines link analysis rankings with content relevance rankings, the relevance rank of a page will increase based on the number of relevant pages that point to it. In other words, if many highly relevant pages point to a selected page, then the selected page must also be highly relevant.

Still further advantages of the present invention will become apparent to those of ordinary skill in the art upon reading and understanding the following detailed description of the preferred embodiments.

BRIEF DESCRIPTION OF THE DRAWINGS

In the accompanying drawings which are incorporated in and constitute a part of the specification, embodiments of the invention are illustrated, which, together with a general description of the invention given above, and the detailed description given below, serve to example the principles of this invention.

DETAILED DESCRIPTION OF ILLUSTRATED EMBODIMENT

The following includes definitions of exemplary terms used throughout the disclosure. Both singular and plural forms of all terms fall within each meaning:

"Page", as used herein, includes but is not limited to one or more web pages, an electronic document, network addresses or links, database addresses or records, or other objects that are identifiable using a search query. "Page" and "document" are used interchangeably.

"Software", as used herein, includes but is not limited to one or more computer executable instructions, routines, algorithms, modules or programs including separate applications or from dynamically linked libraries for performing functions as described herein. Software may also be implemented in various forms such as a servlet, applet, stand-alone, plug-in or other type of application as known to those skilled in the art.

"Logic", as used herein, includes but is not limited to hardware, software and/or combinations of both to perform a function.

"Network", as used herein, includes but is not limited to the internet, intranets, Wide Area Networks (WANs), Local Area Networks (LANs), and transducer links such as those using Modulator-Demodulators (modems).

"Internet", as used herein, includes a wide area data communications network, typically accessible by any user having appropriate software. This includes the World Wide Web. "Intranet" includes a data communications network similar to an internet but typically having access restricted to a specific group of individuals, organizations, or computers.

Figure 1:
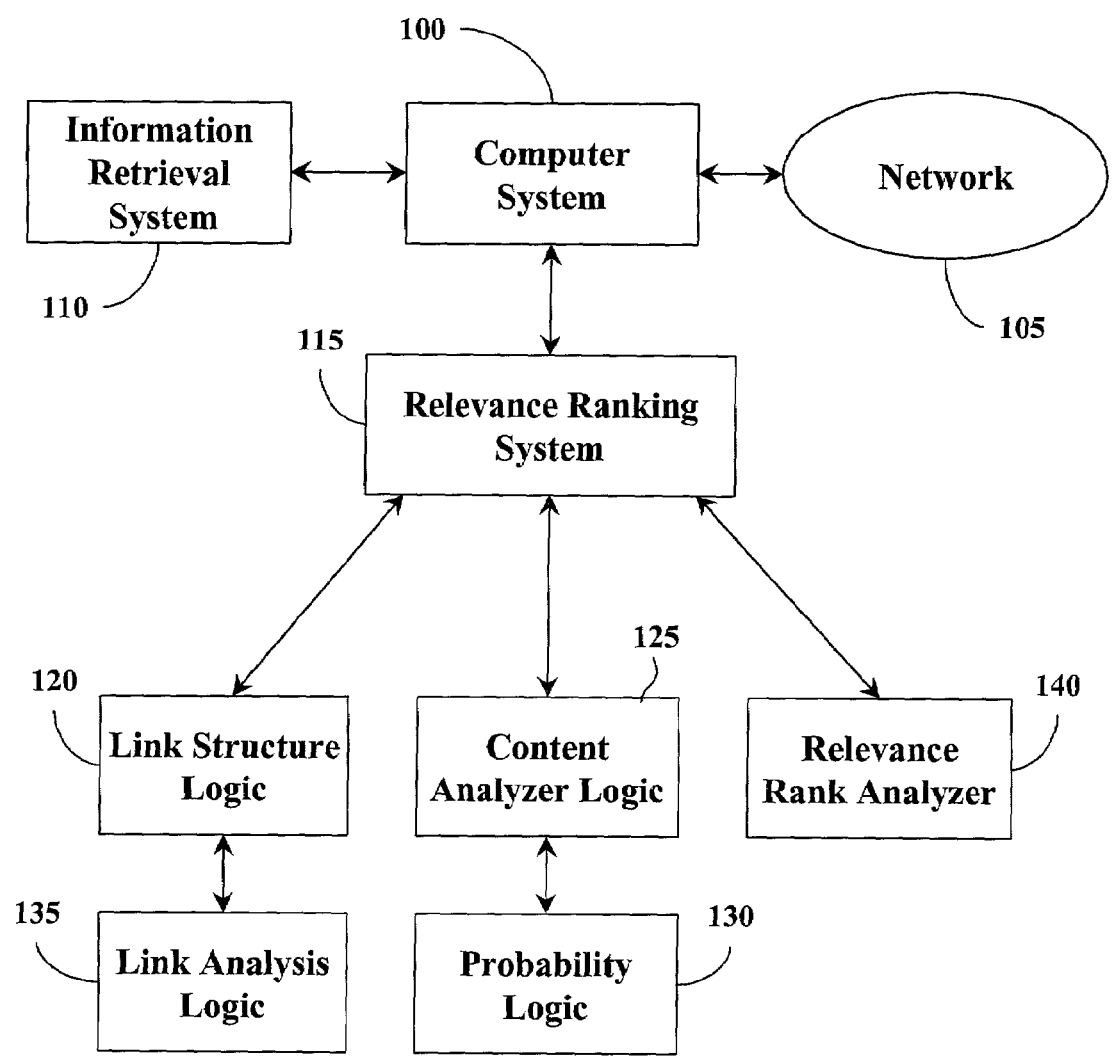
FIG. 1 is an exemplary overall system diagram of a relevance ranking system in accordance with the present invention.

Illustrated in FIG. 1 is an exemplary overall system diagram in accordance with the present invention. A computer system 100 executes software and processes information. The computer system 100 generally may take many forms, from a configuration including a variety of processing units, networked together to function as a integral entity, to a single computer, e.g., a personal computer, operational in a stand-alone environment. The present invention can be embodied in any of these computer system configurations. As known in the art, computer systems may include a variety of components and devices such as a processor, memory, data storage, data communications buses, and a network communications device. The computer system 100 is connected to a network 105, for example, the Internet.

With further reference to FIG. 1, an information retrieval system 110 receives and processes search queries from a user that is trying to locate information on the network 105. The information retrieval system 110 is for example a search engine which is a remotely accessible software program that lets a user perform searches including but not limited to keyword/concept searches for information on the network. The present invention and the techniques described herein are not limited to text searching. One skilled in the art will appreciate that the technique applies to any information retrieval task. Additionally, the technique can be applied in data mining tasks of determining populist views on different topics because link analysis is serving as a popularity contest. In that manner, the retrieval system 110 may include a pre-generated database of indexes that identify web pages, addresses, documents or other objects accessible through the network 105 as is known in the art. In response to a search query, the retrieval system 110 identifies a candidate set of pages that match or possibly match the criteria of the search query.

With further reference to FIG. 1, before the candidate pages are displayed to the user, the pages are processed by a relevance ranking system 115 of the present invention. The relevance ranking system 115 generates a relevance rank for each page such that the most relevant pages are displayed first based on the relevance rank. To briefly summarize, the relevance ranking of a web page is based on combined functions of a content-based relevance ranking for the web page and the link structure of the candidate web pages. The system models the assumptions that a user will be likely to stop searching based on the relevance of a web page and that choosing between two links, a user will be more likely to follow a link to a more relevant page. In that regard, the relevance ranking system 115 determines the probability that a user will stay on a web page and the probability that a user will follow an out-going link from the web page as a function of the relevance of the web page and the relevance of all referred web pages according to the link structure. With these values, the system determines a probability distribution between the candidate pages that reflects a probability that a user will be on a page at any instance of time.

The relevance ranking system 115 is embodied as software and includes software components as described below. The relevance ranking system may be a component within the information retrieval system 110 or may be called and executed externally. Once a candidate set of pages is retrieved, a link structure logic 120 determines the link structure of the pages including the out-going links from each page which become in-coming links to another page. This may be performed by using a spider or web crawler as is known in the art and may be performed dynamically for each candidate set of pages or may be obtained from predetermined link structure information.

Figure 2:
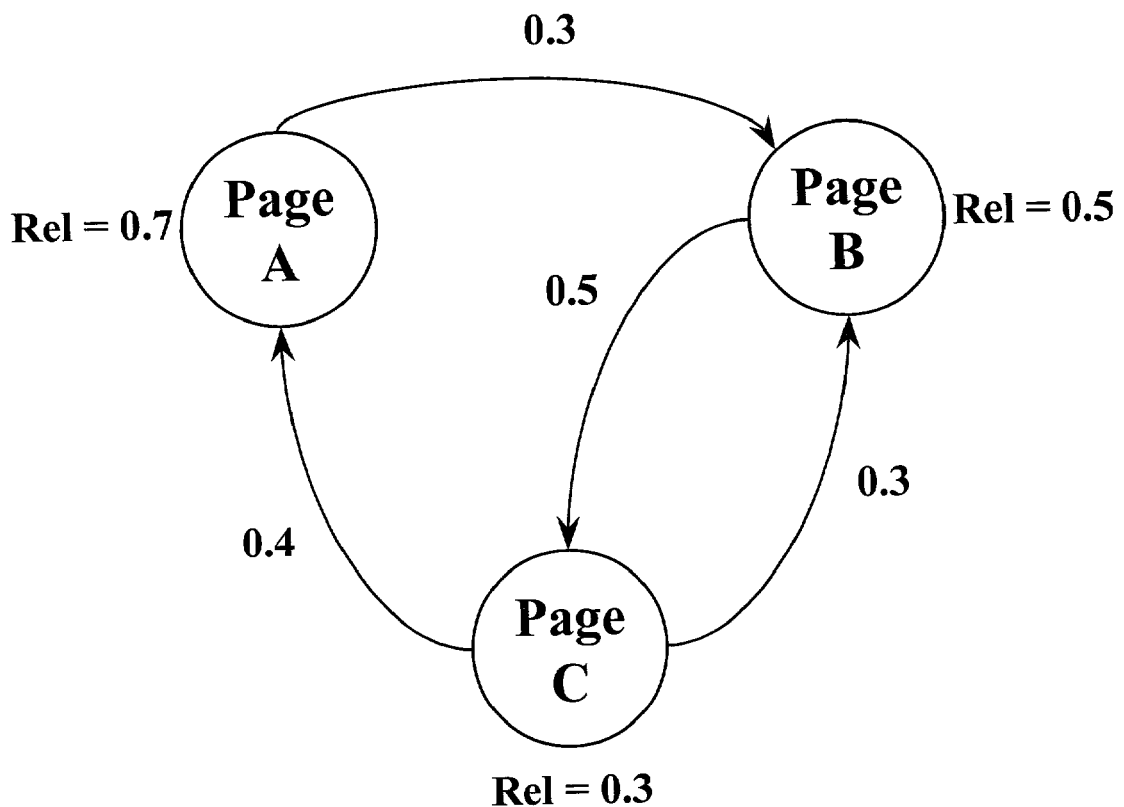
FIG. 2 is an exemplary diagram showing three candidate pages and their link structure including probabilities of following each link and probabilities of being on a given page based on its content relevance.

With reference to FIG. 2, an exemplary link structure is shown for three web pages, namely, page A, page B and page C. For exemplary purposes, we assume that pages A, B and C were retrieved as a candidate set of pages from a search query. Determining the link structure includes visiting each page and identifying links contained therein that refer to other pages. These links are referred to herein as out-going links. As shown in FIG. 2, page A refers to page B and thus has an out-going link A-B. Similarly, other out-going links include B-C, C-A and C-B.

With reference again to FIG. 1, and using the candidate pages from FIG. 2, a content analyzer 125 analyzes the content and/or subject matter of each page and determines its relevance to the keywords from the user's search query. In its simplest form, the content analyzer 125 includes logic that obtains the relevance rank for each page that already has been assigned by the information retrieval system 110 in its ordinary course of retrieval. This may include processing the candidate pages using for example, Oracle Text which is a software tool made by Oracle Corporation that uses natural language processing technology to identify themes and discourse in the text of a page. Pages may also be analyzed for other types of media such as images, audio, video and geographic location information to determine the content of a page. In general, a content relevance rank can be anything that represents the relevance of a page based on an assessment of its content. For example, content relevance values can be between 0 and 100.

Once the content relevance values are obtained for each page, a probability logic 130 determines a probability that a user will stay on a given page as a function of the content relevance values. For example, if the content relevance values are between 0 and 100, these values can be directly translated into a corresponding percentage value to give the probability of staying on a given page. For example, if the content relevance value for page C is 30, then the probability of a user staying on page C is set to 30% (0.3). Of course, many different transformations can be used including non-linear relationships between the relevance values for the page and linked pages and the probability of staying on a page.

With reference again to FIG. 2, let's assume that the content relevance value for pages A, B and C are 70, 50 and 30, respectively. Using a linear relationship, the probability of a user staying "Prob(staying)" on pages A, B and C are 70%, 50% and 30%, respectively. The probability logic 130 then computes the probability of leaving each page A, B and C as 30%, 50% and 70%, respectively. This is determined as 1—Prob(staying).

With further reference to FIG. 1, a link analysis logic 135 is invoked to determine probability values that a user will leave a given page using a certain out-going link. In general, the probability of a user following an out-going link is a function of the link structure of other out-going links and the relevance value of the page being linked to. Stated another way, the probability of leaving "Prob(leaving)" a page is distributed to its out-going links based on the relevance of the child page as compared to the relevance of all child pages and relevance of the parent page. For example, given that the relevance of page C is 0.3 (30% probability of a user staying on page C) and the probability of leaving page C is 0.7, then 0.7 is distributed among its out-going links. The amount that each link receives is influenced by or otherwise weighted by the relevance of its connecting page. For example, out-going link C-A obtains a value of the probability of leaving page C multiplied by the relevance value of page A normalized by the relevance of all child pages linked from page C (e.g. child pages A and B). In other words, the probability of a user following link C-A is Prob(link C-A):

$$Prob(\text{link } C\text{-}A) = Prob(\text{leaving } C) * \frac{\text{Relevance } A}{\sum \text{Relevance of Child Pages}} \quad (1)$$

$$Prob(\text{link } C\text{-}A) = 0.7 * \frac{0.7}{0.7 + 0.5} \approx 0.4 \quad (2)$$

Determining the link rankings for the remaining links is as follows:

$$Prob(\text{link } C\text{-}B) = 0.7 * \frac{0.5}{0.7 + 0.5} \approx 0.3 \quad (3)$$

$$Prob(\text{link } A\text{-}B) = 0.3 * \frac{0.5}{0.5} = 0.3 \quad (4)$$

$$Prob(\text{link } B\text{-}C) = 0.5 * \frac{0.3}{0.3} = 0.5. \quad (5)$$

As shown in Equations (3)–(5), the probability of following out-going link C-B equals 0.7*0.5/1.2 which is approximately 0.3. Doing a similar analysis for the remaining out-going links, the probability of following link A-B is approximately 0.3, and following link B-C is 0.5. Thus, the probability of following an outgoing link from a parent page is a function of the relevance of all referred child pages and the relevance of the parent page. It will be appreciated that there are many ways to distribute probabilities based on probabilities of parent and child pages. Other distributions can reflect the page relevance of a parent.

Once an initial determination of page relevance values and out-going link values are determined, a relevance rank adjuster 140 adjusts the content relevance values for each page based on the probability values of the link analysis. For example, the relevance rank for page A is modified based on the relevance rank of pages that refer to page A as a function of the probability of going to page A from any of those pages. In other words, if more relevant pages point to page A, then page A is probably more relevant. Thus, there should be a greater probability that a user will be on page A at any given time in relation to the other candidate pages. Using FIG. 2 as an example, the relevance rank of page A becomes "$P_A$(being)" representing the probability of a user being on page A at a given point in time is determined as follows:

$$P_A(\text{being}) = P_A(\text{staying}) * P_A(\text{being}) + P(\text{link } C\text{-}A) * P_C(\text{being}) \quad (6)$$

which becomes $$P_A(\text{being}) = 0.7 P_A(\text{being}) + 0.4 P_C(\text{being}) = 20/56$$

and for the other candidate pages:

$$P_B(\text{being}) = 0.5 P_B(\text{being}) + 0.3 P_A(\text{being}) + 0.3 P_C(\text{being})$$
$$= 21/56 \quad (7)$$

$$P_C(\text{being})=0.3P_C(\text{being})+0.5P_B(\text{being})=15/56 \quad (8)$$

$$\text{where } P_A(\text{being})+P_B(\text{being})+P_C(\text{being})=1 \quad (9)$$

The set of four equations have three unknowns that are solved using known linear algebra techniques. As shown in Equations (6–9), the probability of being on a page is based on the relevance of the page weighted by the probability of being on that page and a sum of the values from all in-coming links weighted by the probability of being on the parent page. The probability of a user being on a page "Prob(being)" is a probability distribution to all candidate pages, thus, the sum of probabilities is one (1). The "Prob (being)" is an absolute probability whereas the probability of staying on a page is conditional since it is assumed that a user must be on that page.

Of course, there are other ways to use content-based relevance values to vary or adjust the probability of being on or leaving a page other than by the given examples. The fundamental approach includes determining the relevance of a page based on a combination of its content-based relevance value and the relevance of links that point to the page. Thus, if more relevant pages point to a page, its relevance value will be increased.

Figure 3:
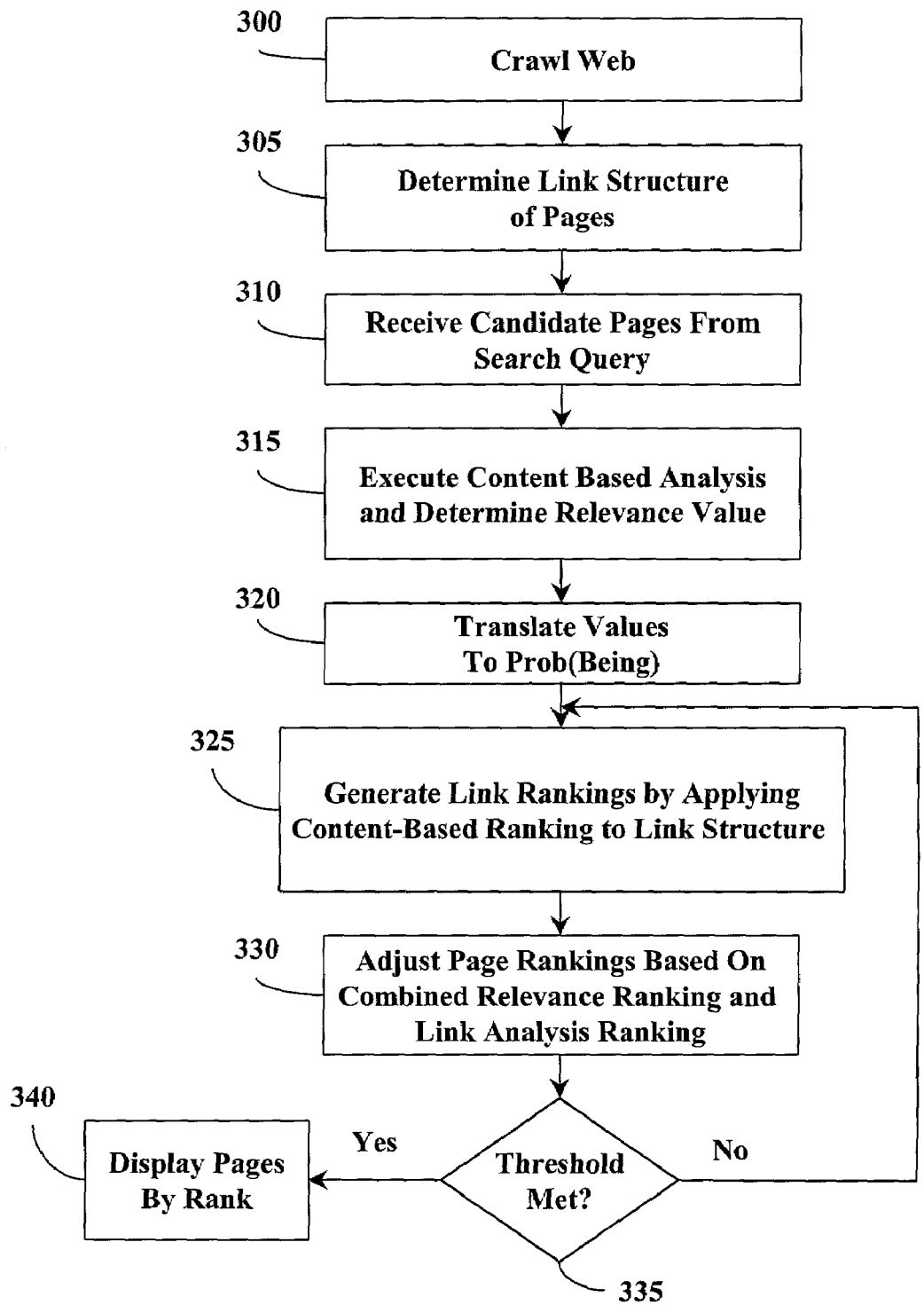
FIG. 3 is an exemplary methodology of determining the relevance rank for candidate pages identified by a search query in accordance with the present invention.

Illustrated in FIG. 3 is an exemplary computer-implemented methodology of determining a relevance ranking for a page in accordance with the present invention. The blocks shown represent functions, actions or events performed therein. It will be appreciated that computer software applications involve dynamic and flexible processes such that the illustrated blocks can be performed in other sequences different than the one shown. It will also be appreciated by one of ordinary skill in the art that the software of the present invention may be implemented using various programming approaches such as procedural, object oriented or artificial intelligence techniques.

With reference to FIG. 3, the process is shown as it applies once a user issues a search query to locate relevant pages from the network. When processing is completed, candidate pages are sequentially listed to the user in an order of most relevant to least relevant based on their relevance value. Since page linking structure influences page relevance values, the link structure for the web pages are determined (blocks 300 and 305). Using the Internet as the exemplary network, software tools such as spiders or web crawlers are used to visit web pages and determine links referred to therein to determine the link structure. It will be appreciated that the link structure can be predetermined prior to receiving search queries or determined on the fly after candidate pages for the search are retrieved and the link analysis can be limited to those pages.

In response to the search query, the information retrieval system 110 identifies a candidate set of pages from the network that potentially match what the user is looking for. For example, the keywords of the query are matched against a pregenerated database of indexes that point to web pages containing or relating to the keyword. The candidate pages are then received by the relevance ranking system 115 for assignment of relevance rankings (block 310). A content-based analysis is executed for each page to determine a relevance value in view of the search query (block 315). As mentioned previously, the relevance value can be any value that reasonably reflects the relevance of the content or subject matter of a page in relation to the key words of the search query. There are many software programs known in the art that can be used to obtain an initial content-based relevance value for a page.

Once an initial relevance value is assigned for each page, the relevance values are translated to a probability that a user will stay on a given page (block 320). If, for example, the initial relevance values are between 0–100 where 100 means the page is very relevant, a simple translation includes directly relating the relevance value of a page to a probability of staying on the page (e.g. relevance value 70 is translated to a 70% probability of staying). Depending on the type of relevance values used, they may directly corresponded to a percentage value as in the above example, or they may be transformed to fit into percentage values based on a desired formula if there is no one-to-one correspondence. The probability of staying on a page depends on a content-based relevance ranking and topology of the pages (link structure).

Figure 4:
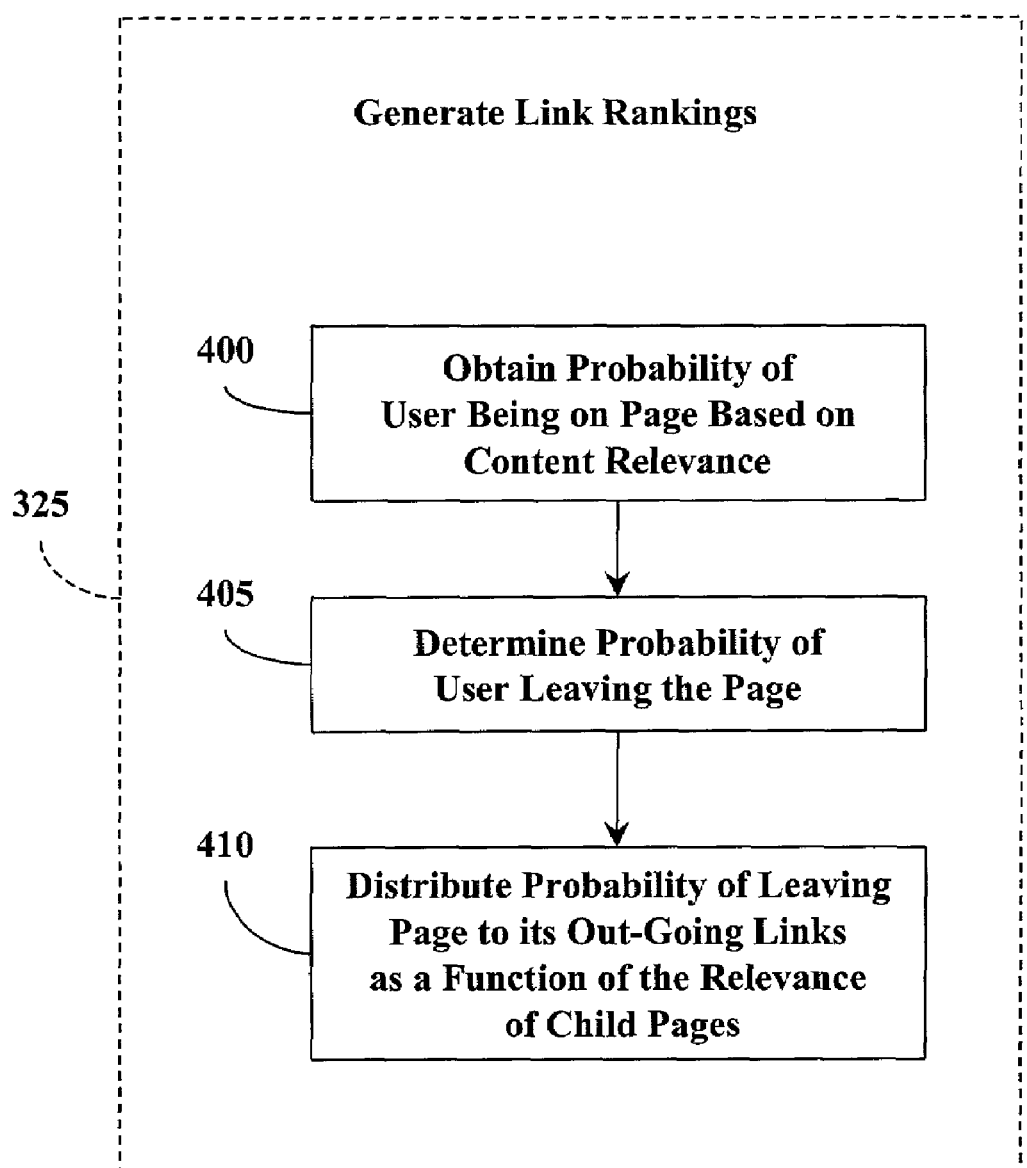
FIG. 4 is an exemplary methodology of generating a link analysis rank.

With further reference to FIG. 3 and FIG. 4, a link analysis is performed for the candidate pages to generate link rankings by applying the content-based rankings to the link structure (block 325). Using the probability of a user staying on a page "Prob(staying)" (block 400), the process determines a probability value that a user will leave the page because the page is not what the user is looking for (block 405). As described previously, the probability of leaving a given page is, for example, 1—Prob(staying). This value is then distributed to the out-going links for that page (block 410). However, the probability that a user follows a link is not equivalent for all links. Rather, a user is more likely to follow a link if the user believes that the link will take them to a more relevant page. The distribution of values to links is based on this principle.

Using the example candidate pages from FIG. 2, a given page will be referred to as a "parent" page and the pages being linked to from the parent page will be referred to as "child" pages. Thus, page C has two child pages, namely, A and B. Also, page B is a child of page A, and page C is a child of page B. A link ranking, representing the probability of a user following a link, is based on the probability of leaving the parent page and the content-based relevance of the child pages. An exemplary distribution is shown above in Equations (1)–(5). Thus, the probability of a user following a link (link value) is a function of the relevance value of the page, the relevance values of its child pages and all other child pages.

With reference again to FIG. 3, at block 330, after the link analysis rankings are found, the relevance values for each page are adjusted based on a combination of a page's current relevance value and link analysis rankings. The relevance value of a page is determined as the probability of a user being on that page "Prob(being)" in relation to the other candidate pages. Exemplary adjustments are shown above in Equations (6)–(8). When the adjusted page relevance rankings are obtain, the adjustments can be repeated using an iterative process until a desire threshold is met (block 335). When complete, the relevance rankings for the candidate pages are returned to the information retrieval system 110 and the candidate pages are displayed to the user typically in an order of most relevant to least relevant.

With the present invention, link analysis rankings become linguistically aware since they are combined with content-based relevance values. The probability of not leaving a webpage and the probability of following an outgoing link from a webpage are functions of the relevance of all referred webpages and the relevance of the webpage. In this manner, improved relevance rankings for web pages are obtained based on a given search query.

While the present invention has been illustrated by the description of embodiments thereof, and while the embodiments have been described in considerable detail, it is not the intention of the applicants to restrict or in any way limit the scope of the appended claims to such detail. Additional advantages and modifications will readily appear to those skilled in the art. For example, the relevance rank system may be a function within the information retrieval system or an external program. The link structure logic may perform the structure analysis dynamically or it may simply obtain link structure information from an external application or source which is available. The same applies to the content analyzer logic. Therefore, the invention, in its broader aspects, is not limited to the specific details, the representative apparatus, and illustrative examples shown and described. Accordingly, departures may be made from such details without departing from the spirit or scope of the applicant's general inventive concept.

I claim:

1. A method of determining a relevance rank for each of a plurality of pages identified by a search query, the method comprising the steps of:
identifying a candidate set of pages in response to the search query;
determining a content-based relevance rank for each of the pages based on a content of each page; and
adjusting the content-based relevance rank for a selected page from the candidate set of pages by distributing the content-based relevance rank from one or more pages that point to the selected page where the distributing is based on a link structure of the pages including link rank values from in-coming links where the link rank values are determined from distributed values of the content-based relevance from the one or more pages that point to the selected page.

2. The method of determining a relevance rank as set forth in claim 1 wherein the content-based relevance rank for each page is determined from a probability value that a user will be on the page in relation to other pages of the identified pages.

3. The method of determining a relevance rank as set forth in claim 2 further including determining the link rank value for each out-going link from an associated page based on a probability of leaving the associated page.

4. The method of determining a relevance rank as set forth in claim 3 wherein the determining the link rank value step includes distributing the probability of leaving the associated page to all out-going links of the associated page weighted by the content-based relevance rank of a page referenced by the out-going link.

5. The method of determining a relevance rank as set forth in claim 4 wherein the adjusting the relevance rank step includes combining the relevance rank of a page with the link rank values of all in-coming links to the page.

6. The method of determining a relevance rank as set forth in claim 1 further including translating the content-based relevance rank for each page to a staying probability value representing a probability that a user will stay on a page.

7. The method of determining a relevance rank as set forth in claim 6 wherein the adjusting step includes adjusting the content-based relevance value for a page based on a link rank value from all in-coming links to the page.

8. The method of claim 1 where the plurality of pages are the candidate set of pages.

9. A method of ranking a set of candidate pages in response to a search query, the method comprising the steps of:
identifying the candidate pages from a network that potentially match the search query;
assigning a content-based relevance rank to each candidate page based on a probability that a user will stay on a selected candidate page;
adjusting the content-based relevance rank of each candidate page where the content-based relevance rank for a selected candidate page is influenced by a quantity and relevance of candidate pages that point to the selected candidate page; and
ranking the candidate pages based on the adjusted content-based relevance rank.

10. The method of ranking a set of candidate pages as set forth in claim 9 further including determining a link value for each out-going link from the candidate pages in accordance with a probability that the user will leave a selected candidate page by following a selected out-going link.

11. The method of ranking a set of candidate pages as set forth in claim 10 wherein the probability of following an out-going link from the selected candidate page is a function of the relevance of all referred pages and the relevance of the selected candidate page.

12. The method of ranking a set of candidate pages as set forth in claim 9 wherein adjusting includes distributing, to the selected candidate page, the quantity and relevance of candidate pages that point to the selected candidate page based on a link structure of the candidate pages.

13. The method of ranking a set of candidate pages as set forth in claim 12 wherein the distributing includes determining a link value for a page link as a probability of following the page link based on a weighted probability of leaving a page by the page link and a relevance of a page being pointed to by the page link.

14. A method of ranking a set of candidate pages in response to a search query, the method comprising the steps of:
identifying the candidate pages from a network that potentially match the search query;
assigning a content-based relevance rank to each candidate page based on a probability that a user will stay on a selected candidate page;
adjusting the content-based relevance rank of each candidate page where the content-based relevance rank for a selected candidate page is influenced by a quantity and relevance of candidate pages that point to the selected candidate page, wherein the adjusting includes determining, for each candidate page, a probability of a user being on a page in relation to all candidate pages, the probability of a user being on a page being set as the adjusted content-based relevance rank for that page; and
ranking the candidate pages based on the adjusted content-based relevance rank.

15. A method of determining a relevance rank for each of a plurality of pages identified by a search query, the method comprising the steps of:
determining a content-based relevance rank for each of the pages based on a content of each page; and
adjusting the content-based relevance rank of each page based on a link structure of the pages including link rank values from in-coming links, the link rank values being based on distributing a probability of leaving a selected page from the plurality of pages identified to out-going links of the selected page.

16. A system for determining a relevance rank for each page of a candidate set of pages identified by a search query, the system comprising:

an information retrieval system for identifying the candidate set of pages from a network in response to the search query;

content analyzer logic for obtaining a content-based relevance rank for each of the pages based on a content of each page; and a relevance rank analyzer for obtaining a relevance rank for each page where the relevance rank for a selected page being obtained by combining the content-based relevance rank of the selected page with distributed values of the content-based relevance rank from one or more pages that point to the selected page where the distributed values include a link analysis rank from in-coming page links, where the link analysis rank being determined from the distributed values of content-based relevance from the one or more pages that point to the selected page.

17. The system for determining a relevance rank as set forth in claim 16 further including link structure logic for obtaining a link structure of the candidate set of pages to determine in-coming and out-going page links.

18. The system for determining a relevance rank as set forth in claim 17 further including a probability logic for determining a staying probability for each page being a probability that a user will stay on a given page, and for determining a leaving probability for each page being a probability that a user will leave a given page.

19. The system for determining a relevance rank as set forth in claim 18 further including link analysis logic for determining the link analysis rank for each out-going page link from the candidate set of pages, where the link analysis rank for an out-going page link from a selected page represents a probability that a user will follow the out-going page link from the selected page.

20. The system for determining a relevance rank as set forth in claim 19 wherein the link analysis logic further includes logic for distributing the leaving probability for the selected page to the out-going page links based on a ratio of the content-based relevance rank of child pages referred to by the out-going page links.

21. A system for determining a relevance ranking for pages obtained from a network search query, the system comprising:

link structure logic for obtaining a link structure of the pages which identifies out-going links from each of the pages which become in-coming links to other pages;

a content analyzer for determining a content of each page;

a content relevance ranking logic for determining a content relevance rank for each page based on a content of the page in relation to the network query;

link analysis logic for determining a link ranking for each of the out-going links for each of the pages, the link ranking for a selected page representing a probability of leaving the selected page by the out-going link; and a relevance rank adjuster for determining and adjusting a relevance rank of a page by combining the content relevance rank with the link rankings associated to in-coming links for the page.

22. The system for determining a relevance ranking as set forth in claim 21 wherein the relevance rank of each page is represented by a probability of a user being on the page in relation to all pages obtained from the search query.

23. The system for determining a relevance ranking as set forth in claim 21 wherein the link analysis logic includes logic for determining a total probability of leaving a page and distributing the total probability of leaving the page to the out-going links of the page.

24. The system for determining a relevance ranking as set forth in claim 23 wherein the link analysis logic distributes the total probability of leaving the page in proportion to a relevance ranking of a child page referred to by the out-going link.

25. The system for determining a relevance ranking as set forth in claim 21 further including an information retrieval system for identifying a candidate set of pages from a network in response to the network search query.

26. A system for determining a relevance rank for each page of a candidate set of pages identified by a search query where the system is embodied as a computer-readable medium that provides processor executable instructions, the system comprising:

an information retrieval system for identifying the candidate set of pages from a network in response to the search query;

content analyzer logic for obtaining a content-based relevance rank for each of the pages based on a content of each page; and a relevance rank analyzer for obtaining a relevance rank for each page where the relevance rank for a selected page being obtained by combining the content-based relevance rank of the selected page with distributed values of the content-based relevance rank from one or more pages that point to the selected page where the distributed values include a link analysis rank from in-coming page links, where the link analysis rank being determined from distributed values of content-based relevance from one or more pages that point to the selected page.

27. A computer-readable medium for providing processor executable instructions operable to perform a method of determining a relevance rank of a plurality of pages identified by a search query, the method comprising:

identifying a candidate set of pages in response to the search query;

determining a content-based relevance rank for each of the pages based on a content of each page; and adjusting the content-based relevance rank for a selected page from the candidate set of pages by distributing the content-based relevance rank from one or more pages that point to the selected page where the distributing is based on a link structure of the pages including link rank values from in-coming links where the link rank values are determined from distributed values of content-based relevance from one or more pages that point to the selected page.

28. A computer-readable medium for providing processor executable instructions operable to perform a method of ranking a set of candidate pages in response to a search query, the method comprising the steps of:

identifying the candidate pages from a network that potentially match the search query;

assigning a content-based relevance rank to each candidate page based on a probability that a user will stay on a selected candidate page;

adjusting the content-based relevance rank of each candidate page where the content-based relevance rank for a selected candidate page is influenced by a quantity and relevance of candidate pages that point to the selected candidate page; and ranking the candidate pages based on the adjusted content-based relevance rank.

29. A computer-readable medium for providing processor executable instructions operable to perform a method determining a relevance rank for each of a plurality of pages identified by a search query, the method comprising the steps of:

determining a content-based relevance rank for each of the pages based on a content of each page; and adjusting the content-based relevance rank of each page based on a link structure of the pages including link rank values from in-coming links, the link rank values being based on distributing a probability of leaving a selected page from the plurality of pages identified to out-going links of the selected page.

* * * * *